United States Patent [19]

Leach

[11] 3,846,540

[45] Nov. 5, 1974

[54] METHOD FOR CONVERTING HIGH-DENSITY LOW-POROSITY ALUMINA INTO LOW-DENSITY HIGH POROSITY ALUMINA

[75] Inventor: Bruce E. Leach, Ponca City, Okla.

[73] Assignee: Continental Oil Company, Ponca City, Okla.

[22] Filed: June 15, 1972

[21] Appl. No.: 263,050

[52] U.S. Cl................. 423/628, 252/463, 264/211
[51] Int. Cl. ......................... C01f 7/02, B01j 11/58
[58] Field of Search ............ 423/628, 630; 252/463

[56] References Cited
UNITED STATES PATENTS 1,976,875  10/1934  Connolly et al. ............... 252/463 X
2,636,865  4/1953  Kimberlin, Jr. ................. 423/628 X
3,577,353  5/1971  White ............................... 252/465

Primary Examiner—M. Weissman
Attorney, Agent, or Firm—F. Lindsay Scott

[57] ABSTRACT

A method for converting high-density, low-porosity alumina into low-density, high-porosity alumina by dispersing said high-density, low-porosity alumina in an acidic aqueous solution and thereafter precipitating alumina by adjusting the pH of the dispersion to a value from about 7 to about 11. The precipitated alumina is then admixed with an organic solvent having a lower surface tension than water and dried to produce a low-density, high-porosity alumina.

11 Claims, No Drawings

METHOD FOR CONVERTING HIGH-DENSITY LOW-POROSITY ALUMINA INTO LOW-DENSITY HIGH POROSITY ALUMINA

BRIEF DESCRIPTION OF THE PRIOR ART

Alumina has been produced by a variety of processes such as the sodium aluminate process, the alum process, the water hydrolysis of alumina alkoxides, and the like. Such alumina is desirable for use as catalysts, catalyst supports, and the like. In such uses, typically, alumina having lower bulk densities, higher porosities, and higher surface areas, is more useful than alumina having higher bulk densities, lower pore volumes, and lower surface areas. As a result, much time and effort have been devoted to the development of methods for producing such low-density, high-porosity, high surface area alumina.

OBJECTS OF THE INVENTION

It is an object of the present invention to provide a method for the production of low-density, high-porosity, alumina. It is a further objective of the present invention to provide a method whereby high-density low-porosity alumina may be converted into low-density high-porosity alumina.

SUMMARY OF THE INVENTION

It has been found that the objectives of the present invention are achieved in a process for converting high-density low-porosity alumina containing up to about 80 weight percent $Al_2O_3$ and produced by the water hydrolysis of alumina alkoxides into low-density, high-porosity alumina wherein said process comprises: dispersing said high-density, low-porosity alumina in a mixture of water and an acid, adjusting the pH of said dispersion to a value from about 7 to about 11 by the addition of an alkaline material to precipitate alumina, admixing an effective amount of an organic solvent having a lower surface tension than water with the precipitated alumina, and thereafter drying to produce low-density, high-porosity alumina, having a loose bulk density from about 20 to about 30 pounds per cubic foot ($lb./ft.^3$), a pore volume from about 0.7 to about 1.3 cubic centimeters per gram (cc/g), and a surface area from about 200 to about 300 square meters per gram ($m^2/g$).

DESCRIPTION OF THE PREFERRED EMBODIMENTS

Alumina as used herein refers to an apparently dry powdered material which may contain in addition to $Al_2O_3$, associated water of hydration, free water, and the like. The degree of drying will be shown hereinafter by reference to the $Al_2O_3$ content of the alumina.

Alumina suitable for use in the present invention is that alumina which has been produced by the water hydrolysis of alumina alkoxides and has an $Al_2O_3$ content below about 80 weight percent. Such alumina typically has a loose bulk density from about 42 to about 50 $lb./ft.^3$, a pore volume from about 0.40 to about 0.55 cc/g, and a surface area from about 200 to about 300 $m^2/g$. While such alumina is useful as a catalyst, catalyst support, and the like, it is a more desirable material for such uses when lower bulk densities, higher pore volumes, and higher surface areas can be obtained.

By the method of the present invention, such alumina is converted to a low-bulk density, high-pore volume alumina, typically having a loose bulk density from about 20 to about 30 $lb./ft.^3$, a pore volume from about 0.7 to about 1.3 cc/g, and a surface area from about 200 to about 300 $m^2/g$.

The method comprises forming a dispersion of such high-density, low-pore volume alumina in acidified water, adjusting the pH of the dispersion to a value from about 7 to about 11 to precipitate the alumina, admixing a suitable organic solvent having a surface tension lower than water with the precipitated alumina, and thereafter drying to produce the desired low-bulk density, high-porosity alumina.

Acids suitable for use in forming the dispersion are selected from the group consisting of monofunctional inorganic acids, monofunctional organic acids containing from about one to about three carbon atoms, and monofunctional halogenated organic acids containing from about two to about three carbon atoms. Some specific examples of such acids are: hydrochloric acid, nitric acid, formic acic, acetic acid, propionic acid, monochloroacetic acid, dichloroacetic acid, and the like. Very desirable results have been obtained when nitric acid was used.

The dispersion may contain any desired amount of alumina up to the solubility limit of the alumina in the dispersing solution. It is believed that $Al_2O_3$ contents in the dispersion above about 18 weight percent will be impractical, and it has been found that most desirable results were obtained when the $Al_2O_3$ concentration of the dispersion was from about 5 to about 15 weight percent.

The acid must be present in an amount equal to from about 0.04 to about 0.12 moles of acid per mole of $Al_2O_3$. Very desirable results have been obtained when from about 0.06 to about 0.11 moles of acid per mole of $Al_2O_3$ were used. When lower amounts of acid are used, it has been found that the desired properties are not realized in the product alumina. When too much acid is used, it has been found that the alumina instead of forming a readily handled dispersion, forms a gelatinous mass which is difficult to handle or filter, and does not otherwise lend itself readily to further processing.

The dispersion may be formed in any convenient manner; however, it has been found that most desirable results were obtained when the starting alumina material was added to the acid-water mixture. Of course, the alumina could be admixed with the water and the acid added to the resulting alumina-water mixture and the like. Such modifications are obvious to those skilled in the art and will not be discussed further. It should be noted that desirable results have been obtained wherein the dispersion was formed at elevated temperatures; i.e., from 50° to about 90°C.

The alumina is precipitated from the dispersion by adjusting the pH of the dispersion to a value from about 7 to about 11. Very desirable results have been obtained when a pH range from about 9.5 to about 10.5 was used. The pH is readily adjusted by the addition of alkaline material to the dispersion. Some suitable alkaline materials are ammonia, ammonium carbonate, and ammonium bicarbonate. It is pointed out that while the above-named alkaline materials are preferred, other alkaline materials are suitable; however, a primary criterion in many applications is that no contaminating cations or anions be left in the product alumina. It will be observed that the enumerated alkaline materials consist of components which are readily lost upon drying and do not result in contaminating anions or cations in the alumina material. In the event that anionic or cationic material in the product alumina is desirable, such materials may be added in a convenient manner by selecting the alkaline material from those alkaline materials containing the desired anion or cation. In the event that lower pH values are used, i.e., below about 8, it has been observed that the alumina precipitate is very difficult to filter and represents handling problems not encountered when a pH from about 9.5 to about 10.5 is used. After precipitation of the alumina, the liquid portion of the dispersion and the alumina precipitate are mixed with an organic solvent having a lower surface tension than water and dried to produce the product alumina. Some suitable solvents are acetone, methanol, ethanol, n-propanol, isopropanol, n-butanol, isobutanol, secondary butanol, tertiary butanol, and the like. It is pointed out that the alumina precipitate may be removed from the dispersion after precipitation by filtration and the like prior to mixing with the organic solvent or the entire reaction product consisting of the liquid portion, and the alumina portion may be admixed with an organic solvent. Suitable methods for the solvent contacting and mixing are more fully shown in U.S. Ser. No. 191,085, entitled "High-Porosity High-Surface Area, High-Surface Area, Low-Bulk Density Alumina," filed Oct. 20, 1971, by W. C. Ziegenhain, and U.S. Ser. No. 218,882, entitled "Method for Producing High-Porosity, High-Surface Area, Low-Bulk Density Alumina," filed Jan. 19, 1972, by W. C. Ziegenhain and J. H. Smith. As shown in the references cited, the most desirable results are obtained when the solvent is present in an amount sufficient to remove the water by azeotropic distillation. Of course, it is not necessary that the alumina be filtered from the dispersion media, and as noted, sufficient solvent may be admixed with the products from the precipitation reaction to azeotropically remove the water by distillation. It is also noted that wherein the alumina is precipitated and removed from the liquid portion of the dispersion, multiple solvent contactings and the like may be used as opposed to adding the solvent in one step. Such techniques are more completely illustrated in the cited references and need not be discussed further.

The drying step, wherein the solvent and water are removed, may be carried out by any convenient method. Numerous such methods are well known to those skilled in the art and need not be described in great detail. Some specific methods are shown in U.S. Ser. No. 244,221, entitled "A Method for Producing Concentrated Alumina Slurries," filed Apr. 14, 1972, by W. C. Ziegenhain, B. E. Leach, and D. O. Coleman, and in U.S. Pat. No. 3,773,691 entitled "Removal of Residual Carbon Contaminants from Alumina," and issued Nov. 20, 1973, by B. E. Leach. In the second reference cited, a technique for reducing the residual carbon on the alumina product is shown.

The alumina produced by the present process typically has a loose bulk density from about 20 to about 30 lb./ft.$^3$, a pore volume from about 0.7 to about 1.3 cc/g, and a surface area from about 200 to about 300 m$^2$/g, whereas the starting alumina material typically has a loose bulk density from about 42 to about 50 lb./ft.$^3$, a pore volume from about 0.40 to about 0.55 cc/g, and a surface area from about 200 to about 300 m$^2$/g. It is readily seen that a significant improvement in loose bulk density and pore volume has been achieved. It should be further noted that the product alumina has the additional desirable property that it is readily extrudable at high $Al_2O_3$ concentrations, as is more fully shown in U.S. Ser. No. 168,420, entitled "Low-Density, High-Porosity Alumina Extrudates and a Method for Producing Said Extrudates," filed Aug. 2, 1971, by B. E. Leach, G. G. Hritz, and D. J. Royer.

Having thus described the invention, it is pointed out that many process modifications and variations are possible within the scope of the present invention, and indeed, such modifications and variations may appear desirable to those skilled in the art, based upon a review of the preceding description of preferred embodiments and the appended examples and claims.

EXAMPLE 1

Two hundred grams of alumina containing about 75 weight percent $Al_2O_3$ and produced by the water hydrolysis of alumina alkoxides produced by the Ziegler process was found to have a loose bulk density of about 45 lb./ft.$^3$, a pore volume of about 0.53 cc/g, and a surface area of about 250 m$^2$/g. Two hundred grams of the described alumina was added to 1,250 cc of water containing 4 cc of nitric acid (0.04 mole of nitric acid per mole of alumina) to produce an alumina dispersion containing 10.3 weight percent $Al_2O_3$. One liter of butanol was added, and the pH adjusted to about 7. The precipitated alumina was filtered, butanol was added, and the resulting solvent-aqueous alumina mixture dried. The density of the final product was 50 lb./ft.$^3$.

It is readily seen that little improvement was achieved by the use of acid levels as low as 0.04 mole of acid per mole of $Al_2O_3$.

EXAMPLE 2

Two hundred grams of the same alumina starting material used in Example 1 was added to 1,250 cc of water containing 4 cc of nitric acid to form an alumina dispersion containing 10.3 weight percent $Al_2O_3$ and 0.04 mole of acid per mole of $Al_2O_3$. One liter of butanol was then added, and the pH adjusted to 7 with ammonia. The mixture was then placed in a blender for one minute, filtered, and washed twice with 1 liter portions of hot (80°C) butanol, filtered and dried. The loose bulk density was 30 lb./ft.$^3$. In drying the alumina at 120°C, it was observed that the precipitates still had a high degree of gel character and retained water.

In light of Examples 1 and 2 above, it is shown that low acid levels, while some improvement may be achieved in some cases, do not result in the maximum improvement possible by the method of the present invention.

EXAMPLE 3

Two hundred grams of alumina, having a loose bulk density of about 45 lb./ft.$^3$, a pore volume (0–10,000 A) of about 0.53 cc/g, and a surface area of about 250 m$^2$/g and produced by the water hydrolysis of alumina alkoxides produced by the Ziegler process, were added to 1 liter of water containing 8 cc of nitric acid and the mixture heated to 70°C. The resulting dispersion contained 11.7 weight percent $Al_2O_3$ and 0.08 mole of acid per mole of alumina. The dispersion was added to 500 cc of water containing ammonia to produce a mixture having a pH of 10, as measured with a standard lab pH meter. Additional ammonia was added as required to keep the pH within the range of 9.6 to 10.0, as the acidified alumina slurry was added. The precipitated alumina was aged at 70°C for 1 hour with the pH at a value of 10. A filter aid was then added to aggregate the particles of alumina and increase the filtration rate. The alumina was readily filtered and thereafter treated with 1 -liter portions of hot (80°C) butanol to which was added ammonia to keep the pH at approximately 8. The butanol treatment was repeated three times to remove water from the cake. The resulting alumina filter cake was dried at 120°C for about 2 hours, crushed, and found to have the following properties: a loose bulk density of about 21.6 lb./ft.$^3$, a pore volume of about 0.98 cc/g, and a surface area of about 248 m$^2$/g. It is readily seen that with the use of higher concentrations of acid significantly improved properties in the product alumina are achieved.

EXAMPLE 4

The alumina produced in Example 3 was extruded by drying to 80 weight percent Al$_2$O$_3$ and then mixing 100 grams of alumina with 100 cc of water containing 2 cc of acetic acid. The resulting putty-like mixture was then extruded, dried at 120°C for about 2 hours, and calcined at 900°F for about 3 hours. The extrudates had a loose bulk density of 21.3 lb./ft.$^3$, a pore volume of 1.17 cc/g, and a surface area of 244 m$^2$/g. It is pointed out that the extrudates retain substantially the desirable properties of the starting alumina. In particular, it is noted that in the tests shown the pore volume of the extrudate has actually increased in the extrudate as compared to the starting alumina.

Having thus described the invention, I claim:

1. A method for converting dispersible high density, low-porosity alumina, having a loose bulk density from about 42 to about 50 lb/ft$^3$ and a pore volume from about 0.40 to about 0.55 cc/g, and containing up to about 80 weight percent Al$_2$O$_3$ and produced by the water hydrolysis of aluminum alkoxides into low-density high porosity alumina said method consisting essentially of sequentially;

a. dispersing said high-density, low-porosity alumina in a mixture of water and an acid selected from the group consisting of hydrochloric acid, nitric acid, formic acid, acetic acid, propionic acid, monochloroacetic acid and dichloroacetic acid to form a dispersion containing up to about 18 weight percent Al$_2$O$_3$ and wherein said acid is present in an amount equal to from about 0.04 to about 0.12 mole per mole of Al$_2$O$_3$;

b. adjusting the pH of said dispersion to a value from about 7 to about 11 by the addition of an alkaline material, selected from the group consisting of ammonia, ammonium bicarbonate and ammonium carbonate, thereby precipitating alumina;

c. admixing an organic solvent selected from the group consisting of acetone, methanol, ethanol, n-propanol, isopropanol, n-butanol, isobutanol and tertiary butanol with the products of the precipitation reaction in (b) to form a solvent-aqueous alumina mixture wherein said solvent is present in an amount sufficient to produce alumina having a loose bulk density from about 20 to about 30 lb/ft$^3$, a pore volume from about 0.70 to about 1.30 cc/g, and a surface area from about 200 to about 300 m$^2$/g; and d. drying said mixture to produce low-density high porosity alumina having a loose bulk density from about 20 to about 30 lb/ft$^3$, a pore volume from about 0.70 to about 1.30 cc/g, and a surface area from about 200 to about 300 m$^2$/g.

2. The method of claim 1 wherein said acid is selected from the group consisting of hydrochloric acid, nitric acid, formic acid, acetic acid, propionic acid, monochloroacetic acid, and dichloroacetic acid.

3. The method of claim 2 wherein said acid is nitric acid.

4. The method of claim 1 wherein said acid is present in an amount equal to from about 0.06 to about 0.11 mole per mole of Al$_2$O$_3$.

5. The method of claim 1 wherein said dispersion contains from about 5 to about 15 weight percent Al$_2$O$_3$.

6. The method of claim 1 wherein said alkaline material is selected from the group consisting of ammonia, ammonium carbonate and ammonium bicarbonate.

7. The method of claim 1 wherein said pH is adjusted to a value from about 9.5 to about 10.5.

8. The method of claim 6 wherein said organic solvent is admixed in an amount at least sufficient to remove the water present in said solvent-aqueous alumina mixture by azeotropic evaporation.

9. The method of claim 1 wherein said alumina is separated from the products of said precipitation reaction.

10. The method of claim 1 wherein said organic solvent is added prior to adjusting the pH and precipitating the alumina from the dispersion.

11. The method of claim 1 wherein said acid is nitric acid, said acid is present in an amount equal to about 0.08 mole per acid per mole of Al$_2$O$_3$, said dispersion is heated to about 70°C, said organic solvent is admixed with said dispersion, the pH is adjusted to a value from about 9.6 to about 10.0, said precipitated alumina is separated from the products of the precipitation reaction, said organic solvent is n-butanol, and the product alumina is dried at 120°C for about 2 hours to yield alumina having a loose bulk density from about 20 to about 30 lb./ft.$^3$, a pore volume from about 0.7 to about 1.3 cc/g, and a surface area from about 200 to about 300 m$^2$/g.

* * * * *